Jan. 2, 1940.   C. L. JOHNSON   2,185,506
INTERNAL COMBUSTION ENGINE
Filed May 20, 1938   4 Sheets-Sheet 2

INVENTOR.
Clarence L. Johnson,
BY
Wilkinson, Huxley, Byron & Knight
ATTORNEYS

Jan. 2, 1940. C. L. JOHNSON 2,185,506
INTERNAL COMBUSTION ENGINE
Filed May 20, 1938 4 Sheets-Sheet 3

INVENTOR.
Clarence L. Johnson,
BY
ATTORNEYS

Jan. 2, 1940.   C. L. JOHNSON   2,185,506
INTERNAL COMBUSTION ENGINE
Filed May 20, 1938   4 Sheets-Sheet 4
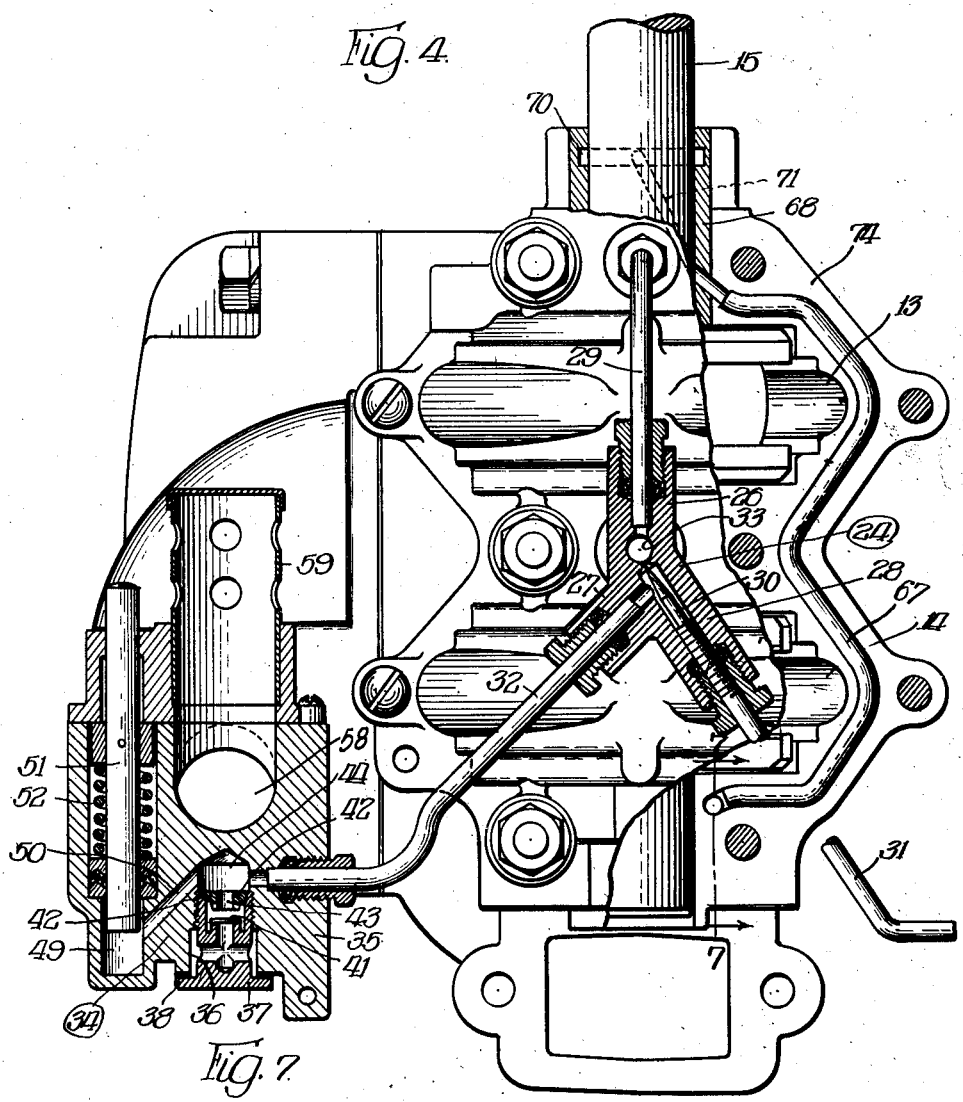
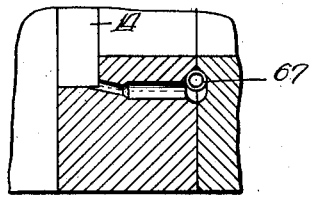
INVENTOR.
Clarence L. Johnson,
BY
Wilkinson, Huxley, Byron & Knight
ATTORNEYS Patented Jan. 2, 1940

2,185,506

UNITED STATES PATENT OFFICE 2,185,506

INTERNAL COMBUSTION ENGINE

Clarence L. Johnson, Waukegan, Ill., assignor to Johnson Brothers Engineering Corporation, Waukegan, Ill., a corporation of Indiana Application May 20, 1938, Serial No. 209,054

17 Claims. (Cl. 123—73)

The present invention relates to internal combustion engines.

The present invention embodies certain of the features disclosed but not claimed in applicant's Patent No. 2,118,761, granted May 24, 1938, together with improvements upon the disclosure in said patent.

The present invention is illustrated in connection with a two-cycle engine and in its broadest aspects may be said to relate to the admission and/or distribution of fuel for low speed or idling conditions and for high speed conditions.

An object of the present invention is to provide an internal combustion engine in which starting is simplified and made more certain.

A further object is to provide an improved internal combustion engine having a jet for low speed or idling conditions and another jet for high speed conditions.

A further object is to provide an internal combustion engine having the two jets referred to, together with means for supplying sufficient fuel to the low speed jet for insuring quick and certain starting.

A further object is to provide an internal combustion engine which is simple in construction and in operation and which is very efficient.

A further object is to provide an internal combustion engine of the two-cycle type having improved means for delivering oil with the fuel into the crank case chambers.

A further object is to provide an internal combustion engine of the two-cycle type well adapted to meet the needs of regular service.

Further objects will appear as the description proceeds.

Referring to the drawings—

Figure 4 is a sectional view taken along the planes indicated by the arrows 4—4 of Figure 3;

Figure 7 is a fragmentary sectional view taken along the plane indicated by the arrows 7—7 of Figure 4.

Figure 1:
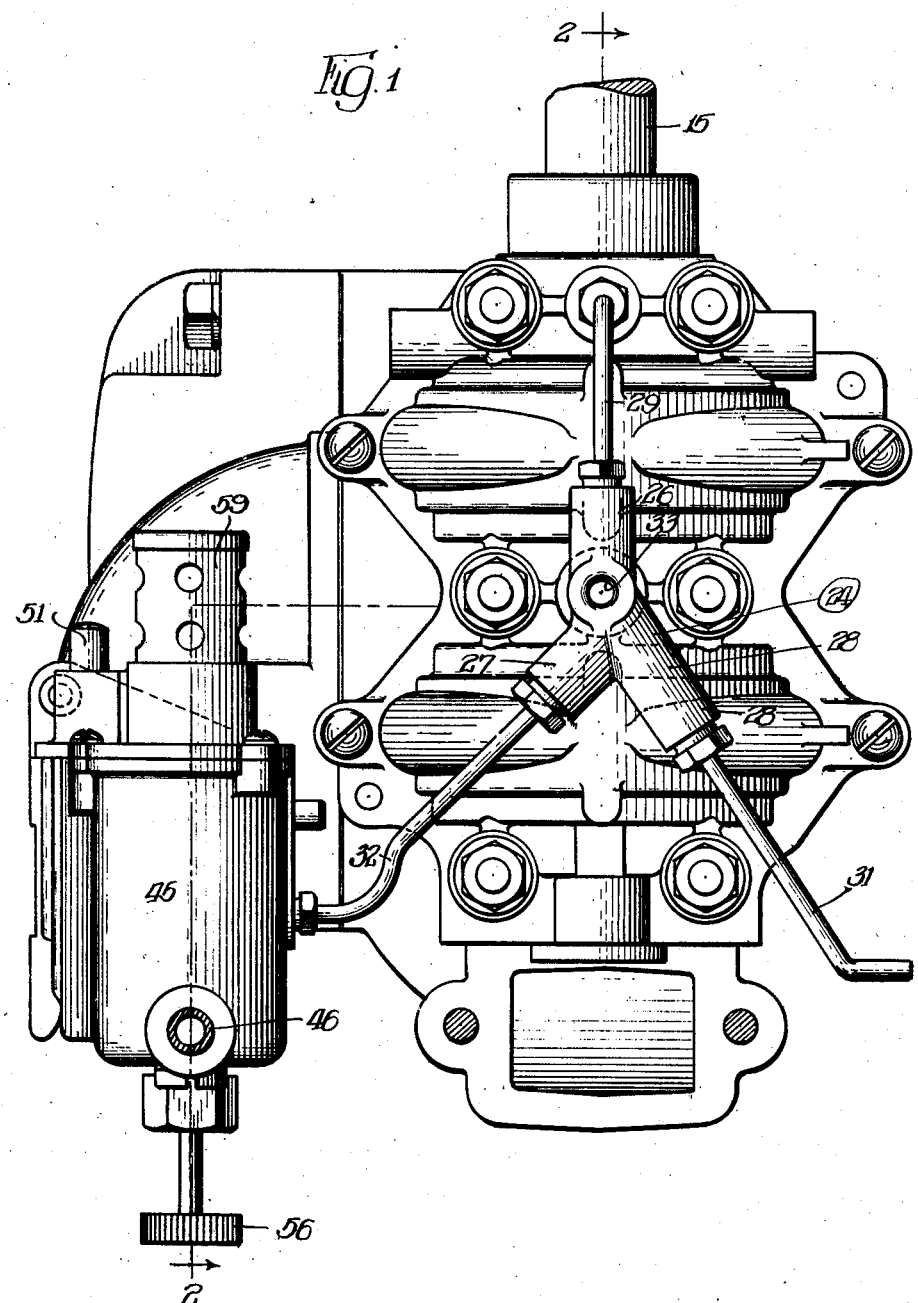
Figure 1 is a view in end elevation of one embodiment of the present invention.

As indicated above, the present invention in its fundamentals is directed to two systems of fuel supply for an internal combustion engine of the two-cycle type, one system, that is—the system for low speed or idling speed operation, being a two-port system, and the other system, that is—the system for high speed operation, being a three-port system. According to the present invention, separate gas jets are provided for low speed operation and for high speed operation, and means, illustrated as a pump, is provided for delivering gas to the low speed system for starting purposes.

The present invention is illustrated as a two-cylinder, two-cycle internal combustion engine, the two cylinders, indicated by the numerals 10—10, being arranged in parallel relationship with each other, one above the other, though as the description proceeds it will be apparent that the invention is applicable to engines of one, two, or more cylinders and to engines in which the cylinders are not in parallel. The numeral 11 indicates a crank shaft housing which is divided by the partition wall 12 into two compartments, indicated by the numerals 13 and 14. Disposed within the housing 11 is the crank shaft, which includes the journal portion 15, the crank portion 16 (located within the compartment 13), the crank portion 17 (located within the compartment 14), and the lower journal portion (not illustrated). Between the cranks 16 and 17 is the journal portion 18. Said journal portion 18 rides within the bearing 19 supported by the partition wall 12. Said partition wall 12 is provided with the aperture 20 adapted to communicate with certain conduits, to be referred to more in detail presently. Said aperture 20 communicates with an aligned aperture 21 in the bearing 19. The journal portion 18 of the crank shaft is provided with the passageways 22 and 23, each of which extends diagonally with respect to the axis of rotation of the journal portion 18. Each of the passageways 22 and 23 has one of its extremities adapted to communicate with the aperture 21 as the journal portion 18 is rotated. Said passageways 22 and 23 extend oppositely to communicate successively with the compartments 13 and 14. Such a construction is illustrated and described in applicant's Patent No. 2,118,761, above referred to.

The journal portion 18 of the crank shaft is a rotary valve for introducing combustible mixtures selectively to the two crank case compartments 13 and 14. This rotary valve forms a part of the two-port or rotary valve system referred to hereinabove for supplying fuel for idling or low speed conditions.

The means for supplying combustible mixture to said rotary valve 18 will now be described.

The numeral 24 indicates a juncture fitting having the tubular leg portion 25 fitting into an enlarged portion of the aperture 20 in the partition wall 12. Said juncture fitting 24 is provided with the three tubular arms 26, 27 and 28. The arm 26 is connected to an oil suction line 29, to be referred to more in detail presently. The arm 28 is provided with the needle valve 30 adapted to be controlled by the rod 31. The arm 27 is provided with the fuel pipe 32. The leg portion 25 is provided with a duct 33, which communicates with the aperture 20 in the partition wall 12 at one of its ends and with the outside atmosphere at its other end. Said oil suction pipe 29 and the fuel pipe 32 both communicate with the duct 33, and the needle valve 30 is adapted to regulate or meter the supply of fuel delivered from the fuel pipe 32 to the duct 33.

The means for supplying fuel to the fuel pipe 32 will now be described. The numeral 34 indicates as a whole a fuel pump. Said pump includes the casing 35. Said casing 35 is provided with the bore 36 screw-threaded at an intermediate portion of its length for the reception of the plug 37. Said plug 37 has a head portion 38 adapted to have liquid-tight engagement with the casing 35. Said plug 37 is provided with the duct 39 extending therethrough transversely with respect to the axis of said plug, which duct 39 at its extremities communicates with the aperture 36 in the casing 35. Said plug 37 is also provided with the axial bore 40 communicating with the transverse duct 39 but stopping short of the head portion 38 thereof. Said plug 37 is recessed at its upper extremity and said recessed portion is provided with a valve seat for receiving the check valve 41. Located in the recessed portion of the upper part of the plug 37 is the insert 42 having the axial bore 43 providing communication between the axial bore 40 and the space 44 above the plug 37. The fuel pipe 32 is connected with said space 44 above the plug 37. Located adjacent to the casing 35 is the gasoline float chamber 45 adapted to be supplied with gasoline through the pipe 46. Said float chamber 45 is provided with the float 47, which is adapted to control inflow of gasoline from the pipe 46 to the float chamber 45. Said float chamber 45 communicates with the aperture 36 through the hole 48.

The casing 35 of the pump 34 is provided with the bore 49, which has communication with the recess 44 through the duct 50. Mounted for reciprocation within the bore 49 is the plunger 51, having a collar attached thereto, the assembly being spring-pressed upwardly by means of the spring 52. Said plunger 51 extends upwardly beyond the casing 35 to provide a portion which may be readily manipulated to cause reciprocations of the plunger 51. Movement of the plunger 51 downwardly will, of course, force any gasoline in the recess 44 and fuel pipe 32 up into the duct 33 in the juncture fitting 24. At this time the check valve 41 will be held closed on its seat. Upon upward movement of the plunger 51 gasoline will be drawn from the float chamber 45 past the check valve 41 to feed the recess 44 and the adjacent portion of the fuel pipe 32, whereby the succeeding downward movement of the plunger 51 will pump another charge of gasoline up past the needle valve 30 into the duct 33. Gasoline thus pumped into the duct 33 will mix with air from the atmosphere entering said duct 33 and will be delivered by the rotary valve embodied in the journal portion 18 successively into the two crank case compartments 13 and 14. After the engine has been started, gasoline will be sucked from the float chamber 45, past the check valve 41, through pipe 32, for delivery successively through the passageways 22 and 23 to the crank case compartments 13 and 14. This, as stated above, provides the two-port fuel feeding system for low speed operation. Velocity is high through the relatively small passageways in this low speed system, even at low speeds, and the fuel is well atomized and held in suspension all the way to the crank case. The construction has the advantage that inasmuch as the fuel pump 34 is a manually operated device, the operator of the engine will not feel the urge to pump excessive charges of gasoline into the low speed system. Therefore the operator is not at all likely to flood the low speed, or two-port, system.

Figure 6:
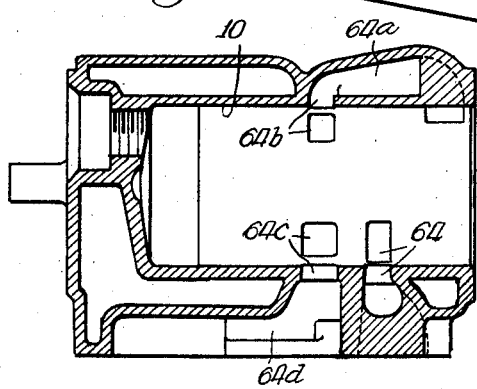
Figure 6 is a sectional view of a cylinder taken along the plane indicated by the arrows 6—6 of Figure 2.
Figure 5:
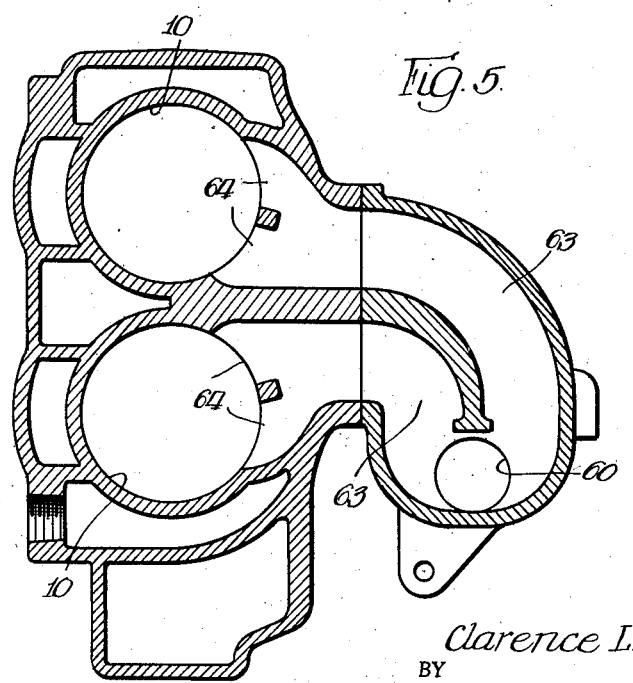
Figure 5 is a sectional view taken along the plane indicated by the arrows 5—5 of Figure 3.

The high speed system for distributing combustible mixtures to the crank case compartments and to the explosion chambers will now be described. In the illustrated embodiment of the present invention this is a three-port fuel feeding system. The numeral 54 indicates a duct adapted to be controlled by the needle valve 55, which needle valve is regulatable by the finger grip 56. The duct 54 is connected with the float chamber 55 through the duct 57. Said duct 54 extends upwardly to the air passageway 58. Said air passageway 58 communicates with the outside atmosphere through the air inlet member 59. Said air passageway 58 is provided with the throat 60, illustrated as being controlled by the butterfly valve 61. The duct 54 supplies gasoline to the air passageway 58 on that side of the butterfly valve 61 adjacent to the air inlet member 59. Mixture of gasoline and air is delivered through the throat 60 to the two parallel passageways indicated by the numerals 63—63 in Figure 5, which two parallel passageways communicate with the ports 64—64 in the walls of the cylinders 10—10. Said ports provide inlets for combustible mixture to the crank case compartments 13 and 14 controlled by the pistons (not shown) in the cylinders 10—10. Said combustible mixture passes from said crank case compartments through bypasses to the cylinders in the manner well understood. The by-pass leading from one of said compartments to one of said cylinders is illustrated in Figure 6 and is indicated by the numeral 64a. It leads to the ports 64b—64b. Exhaust ports 64c—64c communicate with the exhaust passage 64d, whence exhaust gases may be conducted to any preferred region, preferably under water.

Figure 2:
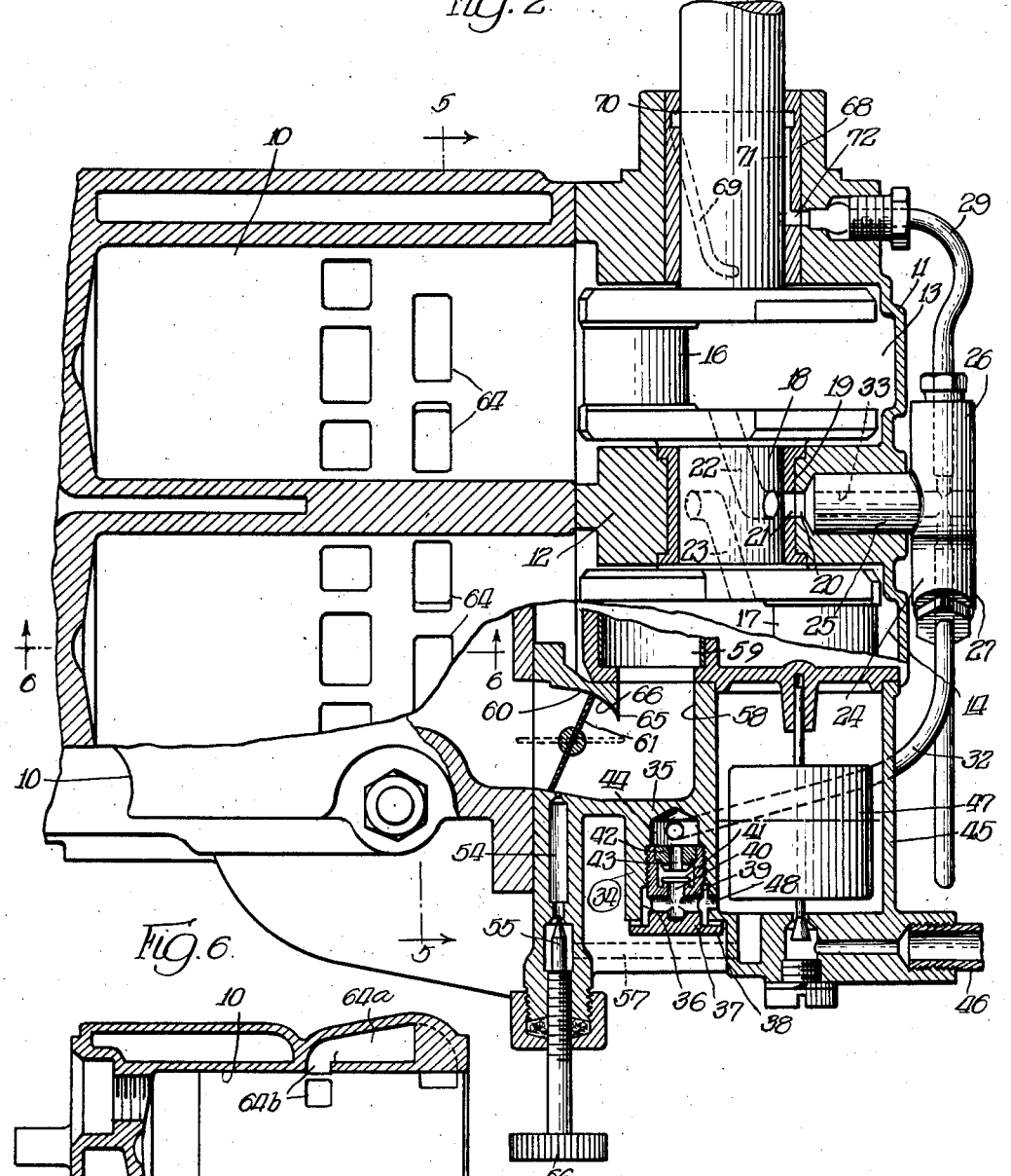
Figure 2 is a sectional view taken along the planes indicated by the arrows 2—2 of Figure 1.

The butterfly valve 61 is illustrated as having its opening movement in a clockwise direction as the parts are viewed in Figure 2. In order to insure that the air from the air passageway 58 will mix intimately with the gasoline delivered through the duct 54, means are provided for restricting the passage of air past the upper side of the valve 61 during the initial stages of opening of said valve 61, while permitting passage of air past the lower side of said valve and permitting passage of air on both sides of said valve 61 when said valve 61 is moved further from closed position. The means referred to for insuring the passage of the air in intimate relationship with the gasoline from the duct 54 is the horn 65, which forms the arcuate wall 66 bounding the course of travel of the upper edge of the valve 61. It will be clear that during the initial stages of the opening movement of the valve 61 in a clockwise direction as the parts are viewed in Figure 2, inrush of air past the upper edge of the valve 61 will be restricted until the lower edge of said valve 61 has moved a considerable distance in a clockwise direction from the position shown in full lines in Figure 2. During this initial portion of the opening movement of valve 61, most, if not all, of the air passing said valve will pass in close proximity to the jet of fuel from duct 54. The approximate full open position of the valve 61 is indicated in broken lines in Figure 2. In the position last referred to, full inrush of air is permitted past both the upper and lower edges of the valve 61.

The present invention contemplates a construction in which oil is delivered with the combustible mixture through the duct 33 into the rotary valve 18 for the two-port system of fuel distribution. The numeral 67 indicates an oil pipe which communicates at one of its extremities with the lower crank case compartment 14 in Figure 4. Said oil duct leads upwardly to the upper journal of the crank shaft 15. In order to receive oil from the pipe 67, the bearing member for the upper portion of the crank shaft 15 (which bearing member is indicated by the numeral 68) is provided with the groove 69 communicating at its lower extremity with said oil duct 67 and communicating at its upper extremity with an annular oil recess 70 which encircles the crank shaft 15. A longitudinally extending recess 71 extends downwardly from the annular recess 70 and is connected with the exterior wall of the bearing member 68 through the aperture 72. Communicating with the aperture 72 in the bearing member 68 is the oil suction return pipe 29, which at its lower extremity communicates through the fitting 24 with the fuel inlet duct 33.

Figure 3:
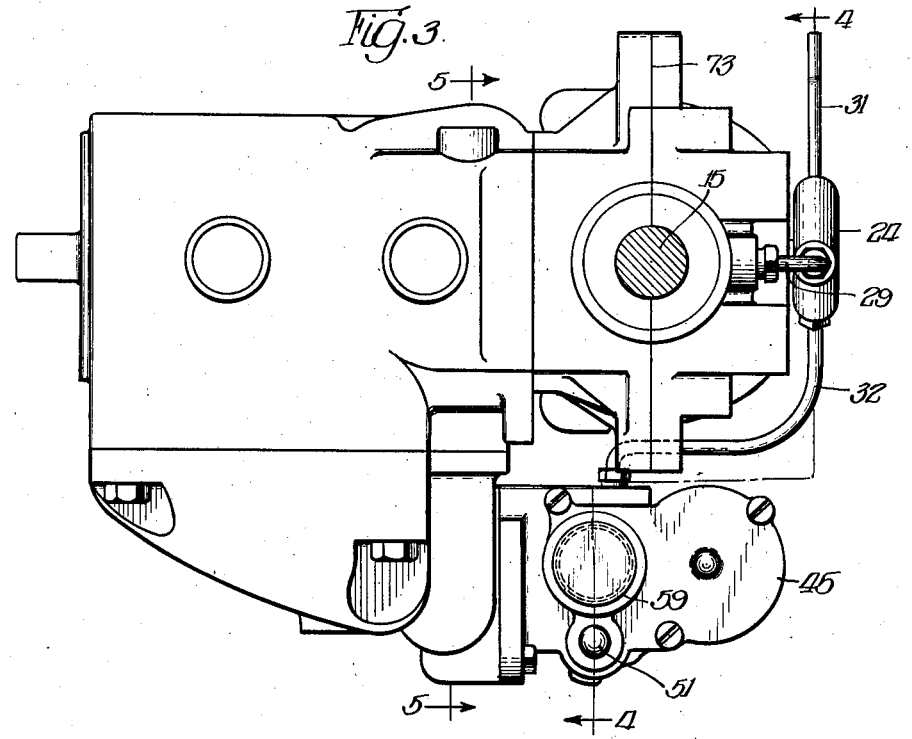
Figure 3 is a top plan view of the construction shown in Figures 1 and 2, the scale being slightly reduced.

It is advantageous from a practical standpoint to mount the oil pipe 67 within the material of the crank case. For this purpose advantage is taken of the fact that the outer portion of the crank case is removable as a unit along the plane indicated in Figure 3 by the numeral 73, according to preferred construction. Said end portion of the crank case and the portion of said crank case adjacent to the cylinders 10—10 will have cooperating plane abutting surfaces, one of which surfaces is indicated in Figure 4 by the numeral 74. Said cooperating plane surfaces will be grooved out for the reception of the oil pipe 67, whereby the advantage is had that the oil pipe is enclosed, thereby reducing the number of appendages about the engine.

In operation, if the operator feels that it is desirable he can prime the engine by operating the plunger 51 (Fig. 4) a few times to pump gasoline from the float chamber 45 (Fig. 2) through the gasoline pipe 32 up to the air duct 33. By reason of the fact that this is preferably a manual operation, the operator will not be tempted to pump so much gasoline as to flood the engine. Suction will be created successively within the crank case compartments 13 and 14 by rotation of the crank shaft 15, which rotation may be accomplished by the usual manual turning of said crank shaft. After the engine has been started it will continue to operate, deriving its fuel from the float chamber 45 past the check valve 41 and through the gasoline pipe 32. Air and gas will be sucked into the compartments 13 and 14 through the rotary valve 18. The flow of gas from the fuel pipe 32 to the duct 33 will be regulated according to the position of the needle valve 30. Turning of the crank shaft 15 will result in the pumping of oil from the lower compartment 14 through the oil duct 67 up to the oil reservoir 70, whence oil will be sucked through the oil return pipe 29 to the duct 33, so that oil will be mixed with the combustible mixture which is delivered through the rotary valve 18. The result is had that excess oil delivered to the upper bearing will be taken care of and will not leak out and dirty the engine and interfere with the magneto.

After the engine has been started, control thereof will be had by manipulation of the valve 61, which controls the flow of gasoline through the duct 54 and the flow of air from the air passageway 58. During the initial portion of the opening movement of the valve, all of the air from the air passageway 58 will pass in proximity to the jet provided by the duct 54. This is accomplished by reason of the protective relationship of the horn 65 with the upper edge of the valve 61. The combustible mixture passing through the throat 60 will, in the manner well understood, pass through the ports 64 in the cylinder walls, which ports are, of course, controlled by the pistons (not shown). Gas entering through said ports will enter the crank case compartments 13 and 14 and will pass to the explosion chambers of the cylinders through the by-passes 64a and the ports 64b. Spent gases will be discharged through the exhaust ports 64c to be discharged from the engine.

Though a preferred embodiment of the present invention has been described in detail, many modifications will occur to those skilled in the art. It is intended to cover all such modifications that fall within the scope of the appended claims.

What is claimed is—

1. An internal combustion engine comprising, in combination, a cylinder, a crank case compartment communicating with said cylinder, means for delivering combustible mixture to said compartment through a high speed system of distribution, means for delivering combustible mixture to said compartment through a low speed system of distribution, said low speed system including a valve operating in synchronism with said engine, conduit means for delivering oil from said compartment to a bearing portion of said engine, and means for drawing off oil from said bearing portion and delivering said oil to the intake for said low speed system of distribution.

2. An internal combustion engine comprising, in combination, a pair of cylinders, a crank shaft housing divided into compartments corresponding to said cylinders, a three-port system of distribution of combustible mixture for high speed operation, a two-port system of distribution of combustible mixture for low speed operation, said two-port system of distribution including a rotary valve operating in synchronism with said engine, and manually operable pump means for delivering fuel to said two-port system of distribution.

3. An internal combustion engine comprising, in combination, a pair of cylinders, a crank shaft housing divided into compartments corresponding to said cylinders, a vertically disposed crank shaft, a three-port system of distribution of combustible mixture for high speed operation, a two-port system of distribution of combustible mixture for low speed operation, said two-port system of distribution including a rotary valve operating in synchronism with said engine, means for delivering oil from said crank shaft housing to the upper bearing of said crank shaft, and means for drawing oil from said upper bearing and delivering said oil to the intake of said two-port system of distribution.

4. An internal combustion engine of the two-cycle type comprising, in combination, a cylinder, a crank shaft housing, means for admitting air and fuel through said cylinder to said housing for high speed operation, a valve operating in synchronism with said engine, means for delivering combustible mixture through said valve to said crank shaft housing for low speed operation, and a pump for delivering fuel to said valve whereby to prime said engine for starting purposes.

5. An internal combustion engine of the two-cycle type comprising, in combination, a cylinder, a crank shaft housing, means for admitting air and fuel through said cylinder to said housing for high speed operation, a valve operating in synchronism with said engine, means for delivering combustible mixture through said valve to said crank shaft housing for low speed operation, the crank shaft of said engine being vertically disposed and having a top bearing, conduit means for delivering oil from said housing to said top bearing, and means for drawing oil from said top bearing and delivering said oil to said valve.

6. An internal combustion engine comprising, in combination, a cylinder, a crank shaft housing, three-port system distribution means for supplying combustible mixture to said housing for high speed operation, two-port system distribution means for delivering combustible mixture to said housing for low speed operation, said two-port system including a valve operating in synchronism with said engine, fuel supply means, and pump means for delivering fuel from said fuel supply means to said two-port distribution system, said pump means having cooperatively associated therewith check valve means for preventing the return flow of fuel to said fuel supply means during motor operation.

7. An internal combustion engine including, in combination, a cylinder, a crank shaft housing, a crank shaft within said housing, said crank shaft being vertically disposed and having an upper bearing, conduit means disposed within the wall of said housing for delivering oil from said housing to said upper bearing, means including a valve operating in synchronism with said engine for delivering combustible mixture to said housing for low speed operation, and a conduit for conducting oil from said upper bearing to said delivering means.

8. An internal combustion engine comprising, in combination, a cylinder, a crank shaft housing, means for delivering combustible mixture through the wall of said cylinder to said housing for high speed operation, means for admitting combustible mixture to said housing for low speed operation, said last mentioned means including a valve operating in synchronism with said engine, a vertically disposed crank shaft within said housing, said crank shaft having an upper bearing, said housing being provided with a slot formed therein providing communication between said housing and said upper bearing, and a conduit connecting said upper bearing with said admitting means.

9. An internal combustion engine of the two-cycle type comprising, in combination, a cylinder, a crank shaft housing communicating with said cylinder, said cylinder having a port adapted to be controlled by the piston of said motor for controlling admission of combustible mixture to said housing through a three-port system of admission for high speed operation, said three-port system including a jet for fuel, a passageway for air and a valve for controlling the admission of fuel from said jet and of air from said passageway to said ports, said valve and said air passageway having cooperating parts for insuring the passage of most of the air from said air passageway along one side of said valve in close proximity to said jet during the initial portion of the opening movement of said valve and for causing passage of said air along both sides of said valve when said valve is moved a material distance from closed position.

10. An internal combustion engine of the two-cycle type comprising, in combination, a cylinder, a crank shaft housing communicating with said cylinder, a port in the wall of said cylinder communicating with said housing for three-port admission of fuel, means for admitting air, a fuel jet communicating with said air admitting means, and a valve for controlling the admission of air and fuel from said air passageway and said jet to said ports, said air admitting means and said valve having cooperating portions for insuring the flow of air from said air admitting means along one side of said valve in close proximity to said fuel jet during the initial stages of the opening movement of said valve and for causing passage of said air along both sides of said valve when said valve is moved a material distance from closed position.

11. An internal combustion engine comprising, in combination, a pair of cylinders, a crank shaft housing divided into compartments corresponding to said cylinders, a three-port system of distribution of combustible mixture for high speed operation, a two-port system of distribution of combustible mixture for low speed operation, said two-port system of distribution including a rotary valve operating in synchronism with said engine, separate fuel jets for supplying said two systems of distribution, and priming means for delivering fuel to the jet for said two-port system of distribution.

12. An internal combustion engine of the two-cycle type comprising, in combination, a cylinder, a crank shaft housing, means for admitting air and fuel through said cylinder to said housing for high speed operation, a valve operating in synchronism with said engine, means for delivering combustible mixture through said valve to said crank shaft housing for low speed operation, each of said means having its individual fuel jet for delivering fuel thereto, and priming means for delivering fuel to the jet for said two-port system of distribution.

13. An internal combustion engine of the two-cycle type comprising, in combination, a cylinder, a crank shaft housing, means for admitting air and fuel through said cylinder to said housing for high speed operation, a valve operating in synchronism with said engine, means for delivering combustible mixture through said valve to said crank shaft housing for low speed operation, each of said means having its individual fuel jet for delivering fuel thereto, and a pump for delivering fuel to said combustible mixture delivering means whereby to prime said engine for starting purposes.

14. An internal combustion engine of the two-cycle type comprising, in combination, a cylinder, a crank shaft housing, means for admitting air and fuel through said cylinder to said housing for high speed operation, a valve operating in synchronism with said engine, means for delivering combustible mixture through said valve to said crank shaft housing for low speed operation, and priming means for delivering fuel to said combustible mixture delivery means whereby to prime said engine for starting purposes.

15. In a two-cycle internal combustion engine having a crank case compression chamber and an explosion chamber, means forming a low speed combustible mixture admission passage and a high speed combustible mixture admission passage to said crank case compression chamber, and priming means for delivering fuel to said low speed passage at a region in proximity to the point of entry of said low speed passage to said compression chamber.

16. In a two-cycle internal combustion engine having a crank case compression chamber and an explosion chamber, means forming a low speed combustible mixture admission passage and a high speed combustible mixture admission passage to said crank case compression chamber, an individual fuel feed for each of said passages, and priming means for delivering fuel to said low speed passage at a region in proximity to the point of entry of said low speed passage to said compression chamber.

17. In a two-cycle internal combustion engine having a crank case compression chamber and an explosion chamber, means forming a low speed combustible mixture admission passage and a high speed combustible mixture admission passage to said crank case compression chamber, and priming means for delivering fuel to said low speed passage.

CLARENCE L. JOHNSON.